J. H. McWILLIAMS.

PAD-LOCK.

No. 7,122. Reissued May 23, 1876

Witnesses

Chas H. Smith

Harold Snell

Inventor

James H. McWilliams per Lemuel W. Serrell

N. PETERS, PHOTO-LITHOGRAPHER, WASHINGTON, D. C.

UNITED STATES PATENT OFFICE.

JAMES H. McWILLIAMS, OF NEW YORK, N. Y.

IMPROVEMENT IN PADLOCKS.

Specification forming part of Letters Patent No. 116,977, dated July 11, 1871; reissue No. 7,122, dated May 23, 1876; application filed May 10, 1875.

*To all whom it may concern:*

Be it known that I, JAMES H. McWILLIAMS, of the city and State of New York, have invented an Improvement in Padlocks, of which the following is a specification:

Padlocks have before been made with circular tumblers, notched at their edges, and acted upon by a key inserted from the bottom of the lock up through the tumblers, and the edges of the tumblers hold the staple-formed shackle by means of notches into which the tumblers enter. Padlocks of this character are known in the trade as the Scandinavian or jail-locks.

In the locks of this construction there is a plate at the lower end of the case, that is put in place after the tumblers and disks have been inserted, and the said plate is retained in place by the edges of the cases being turned over or riveted. The ends of the shackle usually rest upon the inner surface of this plate, and the lock is thereby rendered insecure and liable to get out of order, because any foreign substance falling into either of the holes into which the shackle is inserted will prevent the shackle passing down into its place, and the plate can be driven off by blows upon the upper part of the shackle; besides this, in cases where the lock is exposed to rain, the water is apt to run down the shackle into the lock.

My invention is made with a view to remedying all these defects; and consists in a shackle formed with shoulders around or upon the shackle above the straight portions that enter the lock, so that the shackle cannot be driven into the lock, neither can water run down the shackle into the lock, as heretofore, and the ends of the shackle not touching the plate will not be arrested by any dirt or slight obstruction that may fall into the lock.

Figure 1:
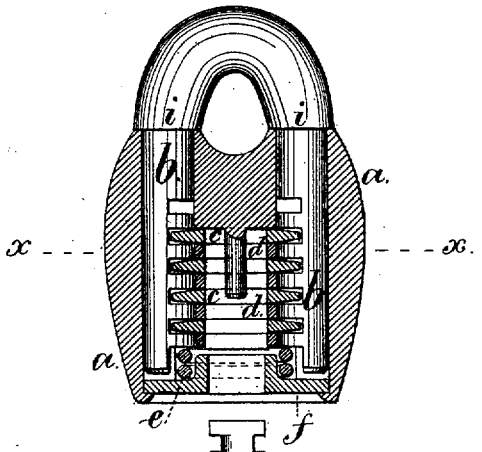
Figure 2:
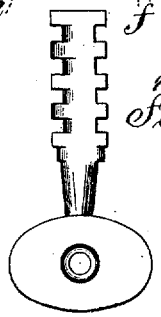
Figure 3:
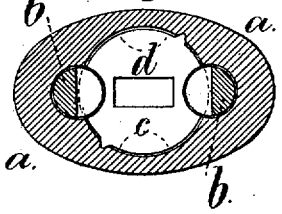

In the drawing, Figure 1 is a vertical section of the lock-case and tumblers. Fig. 2 is a side view of the key; and Fig. 3 is a section at the line *x x*.

The lock-case *a* is made with holes for the parallel portions *b b* of the shackle to pass into, and also with a central cavity for the tumblers *c c*, disks *d d*, and spring *e*, as heretofore usual. The plate *f* is fastened in by the edges of the case *a* being turned over. The upper part of the shackle is formed with the shoulders *i i*, that take against the upper end of the case *a*, for the purposes aforesaid.

In cases where the shackle has been provided with a pin or projection to limit the distance the shackle passes into the lock, the same is liable to be bent, broken, or filed off, and it does not act to keep water out of the lock, and such projection is not easily made or finished, because it has to fit against the inclined surface of the case. In my lock the shackle is constructed with great ease and accuracy, because the parallel portions and shoulders are turned off with facility and precision.

I claim as my invention—

The padlock containing a staple-formed shackle, having shoulders *i* all around the upper parts of the parallel portions *b b* to rest upon the upper part of the case *a*, and notches in the opposite sides of the parallel portions for the tumblers *c*, substantially as and for the purposes set forth.

Signed by me this 7th day of May, A. D. 1875.

J. H. McWILLIAMS.

Witnesses:
GEO. T. PINCKNEY,
CHAS. H. SMITH.